(12) United States Patent
Bian

(10) Patent No.: US 10,816,771 B2
(45) Date of Patent: Oct. 27, 2020

(54) PHOTOGRAPHIC OPTICAL SYSTEM

(71) Applicant: AAC Technologies Pte. Ltd., Singapore (SG)

(72) Inventor: Xuqi Bian, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 187 days.

(21) Appl. No.: 16/236,506

(22) Filed: Dec. 30, 2018

(65) Prior Publication Data

US 2019/0324231 A1    Oct. 24, 2019

(30) Foreign Application Priority Data

Apr. 18, 2018  (CN) .......................... 2018 1 0346820

(51) Int. Cl.
  *G02B 13/00*     (2006.01)
(52) U.S. Cl.
  CPC ............................. *G02B 13/0045* (2013.01)

(58) Field of Classification Search
  CPC .. G02F 1/157; G02F 1/15165; G02F 2203/02; G02B 5/3058; B60R 1/088
  USPC ......................................... 359/642, 754, 756
  See application file for complete search history.

(56) References Cited

U.S. PATENT DOCUMENTS 9,904,037 B1 *   2/2018   Wang ...................... G02B 9/62

\* cited by examiner

*Primary Examiner* — Tuyen Tra
(74) *Attorney, Agent, or Firm* — IPro, PLLC; Na Xu

(57) ABSTRACT

The present disclosure provides a photographic optical system. The photographic optical system includes, from an object side to an image side: a first lens (having a focal length of f1), a second lens (having a focal length of f2), a third lens (having a focal length of f3), a fourth lens (having a focal length of f4), a fifth lens (having a focal length of f5) and a sixth lens (having a focal length of f6) arranged coaxially and satisfying the following relational expressions: $0.8<f1/f<1.2$, $-8<f2/f<-1$, $400<f3/f<600$, $5<f4/f<18$, $0.1<f5/f<1$, $-1<f6/f<-0.1$, where f denotes an overall focal length of the photographic optical system.

10 Claims, 4 Drawing Sheets

PHOTOGRAPHIC OPTICAL SYSTEM

CROSS-REFERENCE TO RELATED APPLICATIONS

The present application claims priority to Chinese Patent Application No. 201810346820.4, filed on Apr. 18, 2018, the content of which is incorporated herein by reference in its entirety.

TECHNICAL FIELD

The present disclosure relates to a photographic optical system, and more particularly, to a photographic optical system for a portable electronic device.

BACKGROUND

In recent years, with the rapid development of miniaturized photographic lenses, the demand for miniature image capturing modules has become increasingly higher. Photosensitive elements of typical photographic lenses include only photosensitive coupling elements or complementary metal oxide conductor elements. With improvement of the semiconductor manufacturing process technology, the pixel size of the photosensitive element can be reduced. In combination with the trend of today's electronic products towards better functions and a lighter and thinner appearance, miniaturized photographic lens with good image quality have become the mainstream in the current market.

In a photographic lens using a photosensitive element, the resolution of an image is gradually increasing, and the size of a pixel is gradually decreasing. Therefore, its corresponding lens needs to meet the requirements of high resolution and excellent optical performance, such as wide angle of the lens, improved lens sensitivity, and reduced lens vulnerability. For an existing photographic lens having a set of six lenses, due to the limitation of its materials, it is difficult to correct its chromatic aberration, and due to its small aperture, the overall brightness of a captured picture is insufficient, resulting in a limited imaging performance.

BRIEF DESCRIPTION OF DRAWINGS

In order to explain the solutions according to the embodiments of the present disclosure more clearly, the figures used in the description of the embodiments will be introduced briefly below. Obviously, the following figures only illustrate some of the embodiments of the present disclosure. Other figures can be obtained by those having ordinary skill in the art from these figures without any inventive efforts. In the figures.

DESCRIPTION OF EMBODIMENTS

In the following, the solutions according to the embodiments of the present disclosure will be described clearly and fully with reference to the figures. Obviously, the embodiments described below are only some, rather than all, of the embodiments of the present disclosure. All other embodiments that can be obtained by those skilled in the art from the embodiments described below without any inventive efforts are to be encompassed by the scope of the present disclosure.

Figure 1:
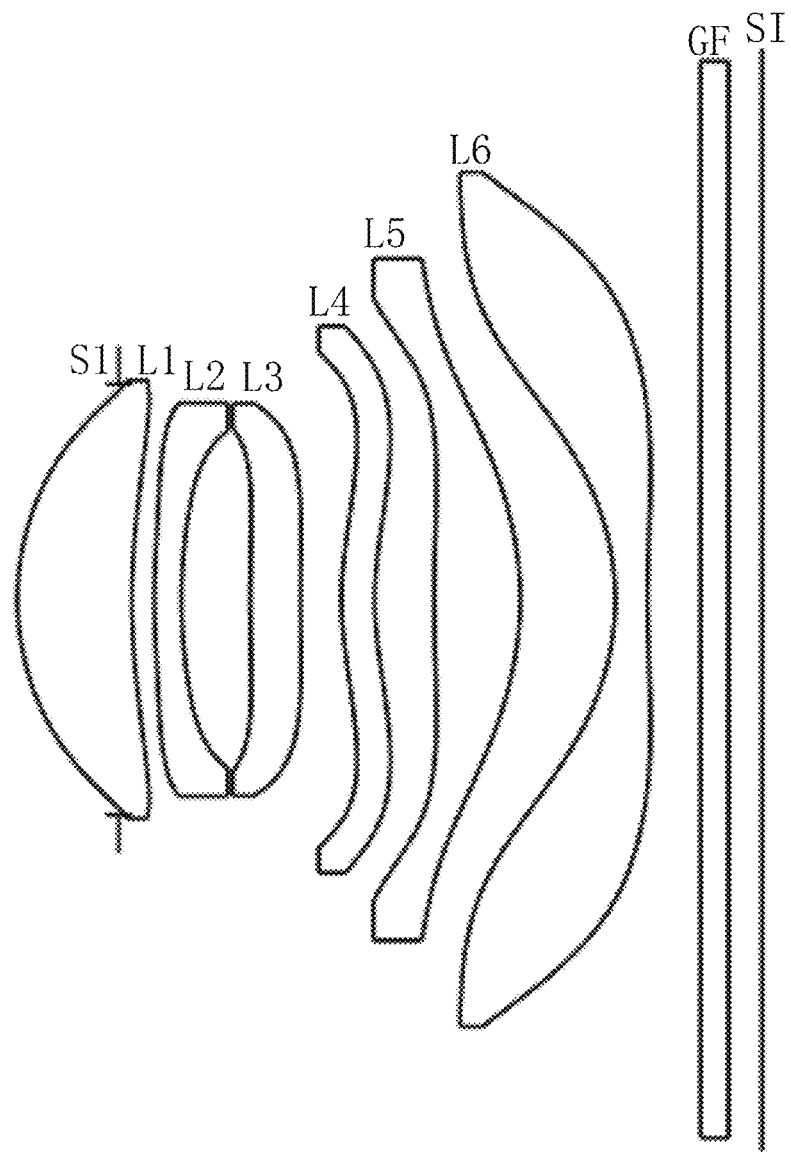
FIG. 1 is a schematic diagram showing a structure of a photographic optical system according to an embodiment of the present disclosure.

Referring to FIG. 1, FIG. 1 is a schematic diagram showing a structure of a photographic optical system according to an embodiment of the present disclosure. The photographic optical system 100 mainly includes six lenses arranged coaxially, which are, from an object side to an image side: a first lens L1, a second lens L2, a third lens L3, a fourth lens L4, a fifth lens L5 and a sixth lens L6. The specific structure will be described as follows.

The first lens L1 has an object side surface being convex near an axis and an image side surface being concave near the axis and is made of glass.

In this embodiment, the object side surface and the image side surface of the first lens L1 can be aspherical surfaces. Alternatively, in other embodiments, the object side surface and the image side surface of the first lens L1 can be spherical surfaces. The present disclosure is not limited to this.

The second lens L2 has an object side surface being convex near the axis and is made of plastic.

The third lens L3 has an object side surface being convex near the axis and is made of plastic.

The fourth lens L4 has an object side surface being convex near the axis and is made of plastic.

The fifth lens L5 has a positive refractive power, has an object side surface being concave near the axis and an image side surface being convex near the axis, and is made of plastic.

The sixth lens L6 has an object side surface being concave near the axis and is made of plastic.

Here, an object side surface being convex means the object side surface being convex towards an object. An object side surface being concave means the object side surface being concave with respect to an object. An image side surface being convex means the image side surface being convex towards an imaging plane. An image side surface being concave means the image side surface being concave with respect to an imaging plane.

The first lens L1 is made of glass, which has better performance in reliability with respect to temperature and humidity while providing an improved optical performance. The fifth lens L5 has a positive refractive power, which can distribute a positive refractive power of the first lens L1, thereby reducing the vulnerability of the system. By reasonably optimizing surface shapes of the six lenses, distributing the refractive power and selecting optical materials, the photographic optical system 1 can provide a better imaging performance in low light conditions.

The photographic optical system 100 can further include an aperture S1 and a glass flat GF. The aperture S1 is used for controlling the amount of light through it and controlling the depth of field. The glass flat GF is provided on the image side of the sixth lens L6. The glass flat GF can be a filter for filtering light and its type can be selected as desired.

In the photographic optical system 100 according to the present disclosure, in order to meet the design requirements of the photographic optical system 100 with respect to miniaturization, high sensitivity, high optical performance and wide view angle, the first lens L1, second lens L2, third lens L3, fourth lens L4, fifth lens L5 and sixth lens L6 of the photographic optical system 100 need to satisfy the following conditions.

1. Focal Lengths

In the overall structure of the photographic optical system 100, the focal lengths of the first lens L1, second lens L2, third lens L3, fourth lens L4, fifth lens L5 and sixth lens L6 of the photographic optical system 100 need to satisfy the following conditions.

$$4.9 \text{ mm} < f1 < 5.2 \text{ mm}, -17.5 \text{ mm} < f2 < -14 \text{ mm}, 2000 \text{ mm} < f3 < 2400 \text{ mm}, 70 \text{ mm} < f4 < 76 \text{ mm}, 3.5 \text{ mm} < f5 < 3.9 \text{ mm}, -3.2 \text{ mm} < f6 < -2.8 \text{ mm};$$

$$0.8 < f1/f < 1.2, -8 < f2/f < -1, 400 < f3/f < 600,$$

$$5 < f4/f < 18, 0.1 < f5/f < 1, -1 < f6/f < -0.1;$$

where f1 denotes a focal length of the first lens; f2 denotes a focal length of the second lens; f3 denotes a focal length of the third lens; f4 denotes a focal length of the fourth lens; f5 denotes a focal length of the fifth lens; f6 denotes a focal length of the sixth lens; and f denotes an overall focal length of the photographic optical system.

2. Refraction Index

In the overall structure of the photographic optical system 100, the refraction indices of the first lens L1, second lens L2, third lens L3, fourth lens L4, fifth lens L5 and sixth lens L6 of the photographic optical system 100 need to satisfy the following conditions.

$$1.58 < n1 < 1.7, 1.64 < n2 < 1.68, 1.52 < n3 < 1.56,$$

$$1.62 < n4 < 1.66, 1.52 < n5 < 1.56, 1.52 < n6 < 1.54;$$

where n1 denotes a refraction index of the first lens; n2 denotes a refraction index of the second lens; n3 denotes a refraction index of the third lens; n4 denotes a refraction index of the fourth lens; n5 denotes a refraction index of the fifth lens; and n6 denotes a refraction index of the sixth lens.

3. Abbe Numbers

In the overall structure of the photographic optical system 100, the abbe numbers of the first lens L1, second lens L2, third lens L3, fourth lens L4, fifth lens L5 and sixth lens L6 of the photographic optical system 100 need to satisfy the following conditions.

$$58 < v1 < 62, 19 < v2 < 22, 54 < v3 < 58, 23 < v4 < 25,$$

$$52 < v5 < 58, 54 < v6 < 58;$$

where v1 denotes an abbe number of the first lens; v2 denotes an abbe number of the second lens; v3 denotes an abbe number of the third lens; v4 denotes an abbe number of the fourth lens; v5 denotes an abbe number of the fifth lens; and v6 denotes an abbe number of the sixth lens.

If the respective focal lengths, refraction indices and abbe numbers of the first lens L1, second lens L2, third lens L3, fourth lens L4, fifth lens L5 and sixth lens L6 do not satisfy the following conditions, the chromatic aberration characteristics and telecentric characteristics of the photographic optical system 100 may degrade and the vulnerability of the photographic optical system 100 may increase, such that it would be difficult to achieve miniaturization, wide view angle and low cost of the photographic optical system 100.

In this embodiment, the photographic optical system 100 has a Total Track Length (TTL) smaller than or equal to 5.6 millimeters, such that it can be made ultra-thin.

In this embodiment, the photographic optical system 100 has an aperture F-number smaller than or equal to 1.45. The larger aperture may provide the better imaging performance.

With this design, the TTL of the entire photographic optical system 100 can be made as short as possible, such that its miniaturization characteristics can be maintained.

Here, TTL means an on-axis distance from the object side surface of the first lens L1 to the imaging plane.

As an example, an inflexion point and/or a stagnation point can be provided on the object side surface and/or image side surface of the lens, so as to meet a high-quality imaging requirement. A specific embodiment can be described below.

In the following, the design data for the photographic optical system 100 according to the present disclosure will be given. The focal lengths, on-axis distances, curvature radiuses and on-axis thickness are in units of millimeters (mm).

Table and Table 2 show the design data for the photographic optical system 100 according to the present disclosure.

TABLE 1

|  | R | d |  | nd |  | vd |  |
|---|---|---|---|---|---|---|---|
| S1 | ∞ | d0 = | −0.762 |  |  |  |  |
| R1 | 1.985 | d1 = | 0.859 | nd1 | 1.6031 | v1 | 60.60 |
| R2 | 4.614 | d2 = | 0.172 |  |  |  |  |
| R3 | 5.553 | d3 = | 0.203 | nd2 | 1.6614 | v2 | 20.41 |
| R4 | 3.590 | d4 = | 0.516 |  |  |  |  |
| R5 | 12.373 | d5 = | 0.378 | nd3 | 1.5439 | v3 | 55.95 |
| R6 | 12.367 | d6 = | 0.309 |  |  |  |  |
| R7 | 2.388 | d7 = | 0.251 | nd4 | 1.6355 | v4 | 23.97 |
| R8 | 2.412 | d8 = | 0.445 |  |  |  |  |
| R9 | 11.843 | d9 = | 0.646 | nd5 | 1.5439 | v5 | 55.95 |
| R10 | −2.415 | d10 = | 0.716 |  |  |  |  |
| R11 | −1.977 | d11 = | 0.242 | nd6 | 1.5352 | v6 | 56.12 |
| R12 | 8.819 | d12 = | 0.400 |  |  |  |  |
| R15 | ∞ | d13 = | 0.210 | ndg | 1.5168 | vg | 64.17 |
| R16 | ∞ | d14 = | 0.253 |  |  |  |  |

The meanings of the above symbols are as follows:

S1: Aperture;

R: Curvature radius of optical surface (central curvature radius for lens)

R1: Curvature radius of the object side surface of the first lens L1;

R2: Curvature radius of the image side surface of the first lens L1;

R3: Curvature radius of the object side surface of the second lens L2;

R4: Curvature radius of the image side surface of the second lens L2;

R5: Curvature radius of the object side surface of the third lens L3;

R6: Curvature radius of the image side surface of the third lens L3;

R7: Curvature radius of the object side surface of the fourth lens L4;

R8: Curvature radius of the image side surface of the fourth lens L4;

R9: Curvature radius of the object side surface of the fifth lens L5;

R10: Curvature radius of the image side surface of the fifth lens L5;

R11: Curvature radius of the object side surface of the sixth lens L6;

R12: Curvature radius of the image side surface of the sixth lens L6;

R15: Curvature radius of the object side surface of the optical filter GF;

R16: Curvature radius of the image side surface of the optical filter GF;

d: On-axis distance between the on-axis thickness of the lens and the lens;

v3: Abbe number of the third lens L3;
v4: Abbe number of the fourth lens L4;
v5: Abbe number of the fifth lens L5;
v6: Abbe number of the sixth lens L6;
vg: Abbe number of the glass flat GF.

Table 2 shows aspherical data of the respective lenses in the photographic optical system 100 according to the present disclosure.

TABLE 2

| | Conic Coefficient | Aspherical Coefficient | | | | | | |
|---|---|---|---|---|---|---|---|---|
| | k | A4 | A6 | A8 | A10 | A12 | A14 | A16 |
| R1 | −2.8745E−01 | −1.2861E−03 | 2.2387E−02 | −3.3475E−02 | 3.1551E−02 | −1.7197E−02 | 5.1286E−03 | −6.5649E−04 |
| R2 | 5.7480E+00 | −4.4454E−02 | 7.9181E−03 | −4.0716E−03 | 7.1373E−03 | −5.8236E−03 | 1.9332E−03 | −2.5280E−04 |
| R3 | 1.1841E+01 | −1.0125E−01 | 2.4679E−02 | 7.0456E−02 | −7.8757E−02 | 3.6665E−02 | −8.2136E−03 | 7.3748E−04 |
| R4 | 6.5788E+00 | −6.6731E−02 | 1.1473E−02 | 8.3763E−02 | −6.2020E−02 | −7.6845E−03 | 2.2660E−02 | −6.3761E−03 |
| R5 | 7.0110E+01 | −4.1108E−02 | −8.9932E−02 | 2.6236E−01 | −4.0850E−01 | 3.3652E−01 | −1.4390E−01 | 2.4654E−02 |
| R6 | −2.1677E+02 | −8.9213E−02 | 7.1665E−02 | −6.2889E−02 | 1.8726E−02 | 3.1288E−03 | −3.8469E−03 | 6.7061E−04 |
| R7 | −8.8234E+00 | −1.0393E−01 | 8.6356E−02 | −6.2239E−02 | 3.0391E−02 | −9.6741E−03 | 1.6477E−03 | −1.0964E−04 |
| R8 | −9.0439E+00 | −8.9824E−02 | 5.5535E−02 | −2.9965E−02 | 1.0525E−02 | −2.4968E−03 | 3.4782E−04 | −2.0332E−05 |
| R9 | 6.3295E+00 | −2.5017E−02 | −8.7130E−03 | 1.0908E−02 | −6.0476E−03 | 1.5311E−03 | −1.7535E−04 | 7.4484E−06 |
| R10 | −4.1141E+00 | −7.3459E−03 | −6.6357E−03 | 5.5416E−03 | −1.4238E−03 | 1.8203E−04 | −1.1991E−05 | 3.2593E−07 |
| R11 | −2.8583E+00 | −3.8377E−02 | 3.6326E−03 | 2.9664E−03 | −8.1784E−04 | 9.0089E−05 | −4.7027E−06 | 9.5805E−08 |
| R12 | −1.0392E+02 | −2.5321E−02 | 3.3688E−03 | −1.0717E−04 | −6.7343E−05 | 8.9339E−06 | −3.9423E−07 | 5.7703E−09 | d0: On-axis distance between the aperture S1 and the object side surface of the first lens L1;

d1: On-axis thickness of the first lens L1;

d2: On-axis distance between the image side surface of the first lens L1 and the object side surface of the second lens L2;

d3: On-axis thickness of the second lens L2;

d4: On-axis distance between the image side surface of the second lens L2 and the object side surface of the third lens L3;

d5: On-axis thickness of the third lens L3;

d6: On-axis distance between the image side surface of the third lens L3 and the object side surface of the fourth lens L4;

d7: On-axis thickness of the fourth lens L4;

d8: On-axis distance between the image side surface of the fourth lens L4 and the object side surface of the fifth lens L5;

d9: On-axis thickness of the fifth lens L5;

d10: On-axis distance between the image side surface of the fifth lens L5 and the object side surface of the sixth lens L6;

d11: On-axis thickness of the sixth lens L6;

d12: On-axis distance between the image side surface of the sixth lens L6 and the object side surface of the glass flat GF;

d13: On-axis thickness of glass flat GF;

d14: On-axis distance between the image side surface of the glass flat GF and the imaging plane;

nd: Refraction index of d-line;

nd1: Refraction index of d-line of the first lens L1;

nd2: Refraction index of d-line of the second lens L2;

nd3: Refraction index of d-line of the third lens L3;

nd4: Refraction index of d-line of the fourth lens L4;

nd5: Refraction index of d-line of the fifth lens L5;

nd6: Refraction index of d-line of the sixth lens L6;

ndg: Refraction index of d-line of the glass flat GF;

vd: Abbe number;

v1: Abbe number of the first lens L1;

v2: Abbe number of the second lens L2;

The above k is a conic coefficient and A4, A6, A8, A10, A12, A14 and A16 are aspherical coefficients.

IH: Image Height.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

For the sake of simplicity, the aspherical surfaces of the respective lens surfaces use the aspherical surface shown in the above Equation (1). However, the present disclosure is not limited to the aspherical polynomial form shown in Equation (1).

Table 3 shows relationships between Chief Ray Angles (CRAs) and IHs of the photographic optical system.

TABLE 3

| Maximum IH Percentages | CRA (degrees) |
|---|---|
| 0.1H | 8.0 |
| 0.2H | 15.5 |
| 0.3H | 22.0 |
| 0.4H | 27.1 |
| 0.5H | 30.6 |
| 0.6H | 32.7 |
| 0.7H | 33.4 |
| 0.8H | 33.0 |
| 0.9H | 32.6 |
| 1.0H | 32.1 |
| max | 33.4 |

In this embodiment, the entrance pupil diameter is 3.243 mm, the full field IH is 3.9283 mm, and the field angle in the diagonal direction is 78.81°

Table 4 and Table 5 show design data for inflexion points and/or stagnation points of the respective lenses in the photographic optical system 100 according to the present disclosure. Here, P1R1 and P1R2 represent the object side surface and the image side surface of the first lens L1, respectively. P2R1 and P2R2 represent the object side surface and the image side surface of the second lens L2, respectively. P3R1 and P3R2 represent the object side surface and the image side surface of the third lens L3, respectively. P4R1 and P4R2 represent the object side surface and the image side surface of the fourth lens L4, respectively. P5R1 and P5R2 represent the object side surface and the image side surface of the fifth lens L5, respectively. P6R1 and P6R2 represent the object side surface and the image side surface of the sixth lens L6, respectively. Data in the "Inflexion Point Position" column represents vertical distances, in millimeters, between the inflexion points on the surfaces of the respective lenses and the optical axis of the photographic optical system 100. Data in the "Stagnation Point Position" column represents vertical distances, in millimeters, between the stagnation points on the surfaces of the respective lenses and the optical axis of the photographic optical system 100.

TABLE 4

|  | Number of Inflexion Points | Inflexion Point Position 1 | Inflexion Point Position 2 |
|---|---|---|---|
| P1R1 | 1 | 1.505 |  |
| P1R2 | 1 | 1.115 |  |
| P2R1 | 2 | 0.485 | 0.685 |
| P2R2 | 0 |  |  |
| P3R1 | 1 | 0.375 |  |
| P3R2 | 1 | 0.275 |  |
| P4R1 | 1 | 0.595 |  |
| P4R2 | 1 | 0.595 |  |
| P5R1 | 2 | 0.515 | 2.005 |
| P5R2 | 2 | 1.465 | 2.555 |
| P6R1 | 2 | 1.545 | 3.055 |
| P6R2 | 2 | 0.515 | 3.015 |

TABLE 5

|  | Number of Stagnation Points | Stagnation Point Position 1 |
|---|---|---|
| P1R1 | 0 |  |
| P1R2 | 1 | 1.505 |
| P2R1 | 0 |  |
| P2R2 | 0 |  |
| P3R1 | 1 | 0.635 |
| P3R2 | 1 | 0.505 |
| P4R1 | 1 | 1.205 |
| P4R2 | 1 | 1.205 |
| P5R1 | 1 | 0.885 |
| P5R2 | 0 |  |
| P6R1 | 0 |  |
| P6R2 | 1 | 0.955 |

In this embodiment, the focal lengths of the first lens L1, second lens L2, third lens L3, fourth lens L4, fifth lens L5 and sixth lens L6 of the photographic optical system 100 are shown in Table 6 below.

TABLE 6

| Type | Focal Length (mm) |
|---|---|
| Photographic Optical System | 4.70 |
| First Lens | 5.13 |
| Second Lens | −15.89 |
| Third Lens | 2205.82 |
| Fourth Lens | 73.99 |
| Fifth Lens | 3.73 |
| Sixth Lens | −2.98 |

In this embodiment, the combined focal length, f12, of the first lens and the second lens is 6.72, such that the aberrations and distortions in the photographic optical system can be removed and the back focal length of the photographic optical system can be reduced, thereby maintaining miniaturization of the photographic optical system.

The surface type and Semi-Diameter (SD) data for the object side surface and the image side surface of the first lens L1, second lens L2, third lens L3, fourth lens L4, fifth lens L5 and sixth lens L6 of the photographic optical system 100 are shown in Table 7 below.

TABLE 7

| Lens | Surface Type | SD |
|---|---|---|
| L1 | aspherical surface | 1.651 |
|  | aspherical surface | 1.600 |
| L2 | aspherical surface | 1.483 |
|  | aspherical surface | 1.271 |
| L3 | aspherical surface | 1.297 |
|  | aspherical surface | 1.480 |
| L4 | aspherical surface | 1.867 |
|  | aspherical surface | 2.045 |
| L5 | aspherical surface | 2.234 |
|  | aspherical surface | 2.495 |
| L6 | aspherical surface | 2.898 |
|  | aspherical surface | 3.123 |

Figure 2:
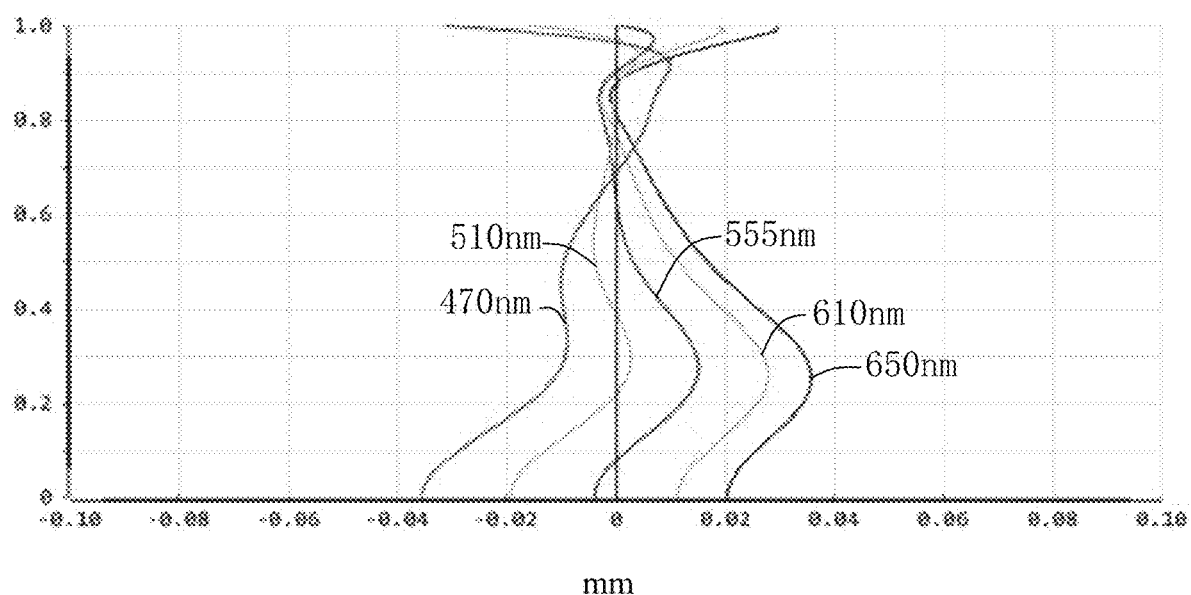
FIG. 2 is a schematic diagram showing an axial aberration of the photographic optical system shown in FIG. 1.
Figure 3:
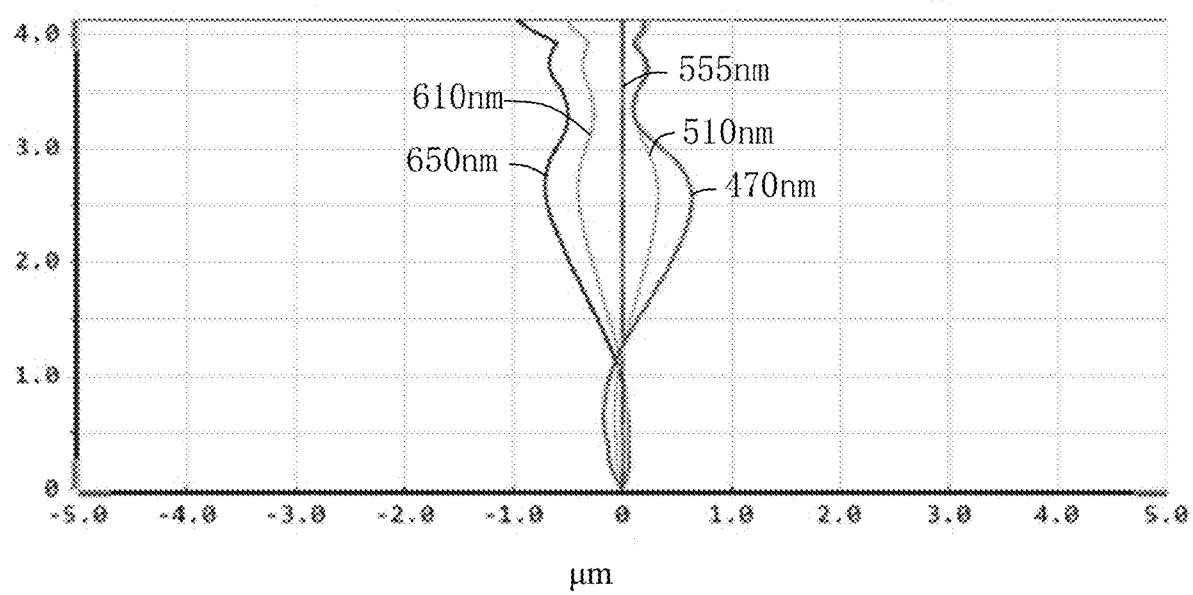
FIG. 3 is a schematic diagram showing a magnification chromatic aberration of the photographic optical system shown in FIG. 1.
Figure 4:
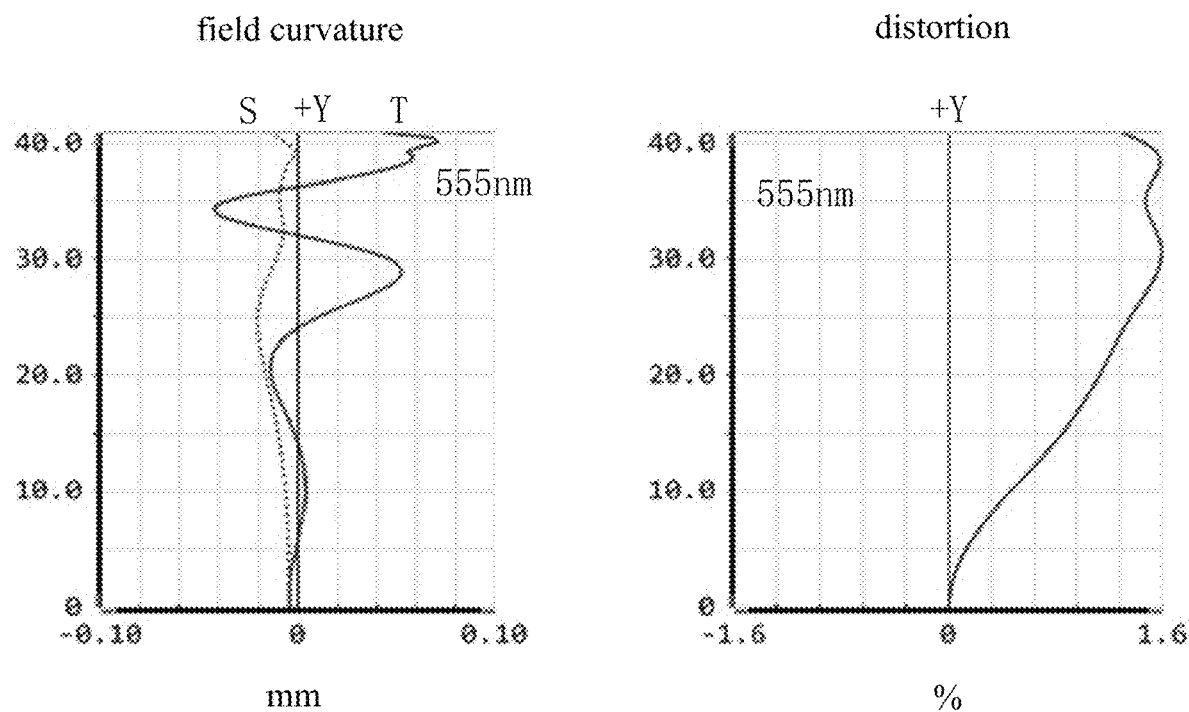
FIG. 4 is a schematic diagram showing a field curvature and a distortion of the photographic optical system shown in FIG. 1.

Here, FIG. 2 and FIG. 3 are schematic diagrams showing an axial aberration and a magnification chromatic aberration of light having wavelengths of 470 nm, 510 nm, 555 nm, 610 nm and 650 nm passing through the photographic optical system 100, respectively. FIG. 4 is a schematic diagram showing a field curvature and a distortion of light having a wavelength of 555 nm passing through the photographic optical system 100. The field curvature S in FIG. 4 is the field curvature in the sagittal direction, and T is the field curvature in the meridional direction.

Compared with the related art, the photographic optical system according to the present disclosure has the following advantageous effects. With the photographic optical system according to the present disclosure, by reasonably optimizing surface shapes, distributing refractive power and selecting optical materials, a photographic optical system having a relatively large aperture is designed, so as to provide clear images in low light conditions. The first lens is made of glass, such that the chromatic aberration can be corrected effectively, the optical performance can be improved and the better performance in reliabilities with respect to temperature and humidity can be provided.

While the preferred embodiments of the present disclosure have been described above, the present disclosure is not limited thereto. Various modifications and alternatives can be made by those skilled in the art. All these modifications, alternatives and improvements that are made without departing from the spirits and principles of the present disclosure are to be encompassed by the scope of the present disclosure.

What is claimed is:

1. A photographic optical system, comprising, from an object side to an image side: a first lens, a second lens, a third lens, a fourth lens, a fifth lens and a sixth lens arranged coaxially and satisfying the following relational expressions:

$$0.8 < f1/f < 1.2$$

$$-8 < f2/f < -1$$

$$400 < f3/f < 600$$

$$5 < f4/f < 18$$

$$0.1 < f5/f < 1$$

$$-1 < f6/f < -0.1$$

where
f1 denotes a focal length of the first lens;
f2 denotes a focal length of the second lens;
f3 denotes a focal length of the third lens;
f4 denotes a focal length of the fourth lens;
f5 denotes a focal length of the fifth lens;
f6 denotes a focal length of the sixth lens; and
f denotes an overall focal length of the photographic optical system.

2. The photographic optical system as described in claim 1, wherein the first lens has an object side surface being convex near an axis and an image side surface being concave near the axis and satisfies the following relational expressions:

$$4.9<f1<5.2$$

$$1.58<n1<1.7$$

$$58<v1<62$$

where
n1 denotes a refraction index of the first lens; and
v1 denotes an abbe number of the first lens.

3. The photographic optical system as described in claim 1, wherein the second lens has an object side surface being convex near an axis and satisfies the following relational expressions:

$$-17.5<f2<-14$$

$$1.64<n2<1.68$$

$$19<v2<22$$

where
n2 denotes a refraction index of the second lens; and
v2 denotes an abbe number of the second lens.

4. The photographic optical system as described in claim 1, wherein the third lens has an object side surface being convex near an axis and satisfies the following relational expressions:

$$2000<f3<2400$$

$$1.52<n3<1.56$$

$$54<v3<58$$

where
n3 denotes a refraction index of the third lens; and
v3 denotes an abbe number of the third lens.

5. The photographic optical system as described in claim 1, wherein the fourth lens has an object side surface being convex near an axis and satisfies the following relational expressions:

$$70<f4<76$$

$$1.62<n4<1.66$$

$$23<v4<25$$

where
n4 denotes a refraction index of the fourth lens; and
v4 denotes an abbe number of the fourth lens.

6. The photographic optical system as described in claim 1, wherein the fifth lens has a positive refractive power, has an object side surface being concave near an axis and an image side surface being convex near the axis, and satisfies the following relational expressions:

$$3.5<f5<3.9$$

$$1.52<n5<1.56$$

$$52<v5<58$$

where
n5 denotes a refraction index of the fifth lens; and
v5 denotes an abbe number of the fifth lens.

7. The photographic optical system as described in claim 1, wherein the sixth lens has an object side surface being concave near an axis and satisfies the following relational expressions:

$$-3.2<f6<-2.8$$

$$1.52<n6<1.54$$

$$54<v6<58$$

where
n6 denotes a refraction index of the sixth lens; and
v6 denotes an abbe number of the sixth lens.

8. The photographic optical system as described in claim 1, wherein the photographic optical system has a Total Track Length (TTL) smaller than or equal to 5.6 millimeters.

9. The photographic optical system as described in claim 1, wherein the photographic optical system has an aperture F-number smaller than or equal to 1.45.

10. The photographic optical system as described in claim 1, wherein the first lens is a glass lens.

* * * * *